United States Patent
Tort et al.

(10) Patent No.: US 12,241,031 B2
(45) Date of Patent: Mar. 4, 2025

(54) COMPOSITION OF ADDITIVES COMPRISING A COPOLYMER AND A RESIN

(71) Applicant: TotalEnergies OneTech, Courbevoie (FR)

(72) Inventors: Frederic Tort, Givors (FR); Thomas Fritsch, Givors (FR)

(73) Assignee: TotalEnergies OneTech, Courbevoie (FR)

( * ) Notice: Subject to any disclaimer, the term of this patent is extended or adjusted under 35 U.S.C. 154(b) by 0 days.

(21) Appl. No.: 18/268,975

(22) PCT Filed: Dec. 22, 2021

(86) PCT No.: PCT/FR2021/052426
§ 371 (c)(1),
(2) Date: Jun. 21, 2023

(87) PCT Pub. No.: WO2022/136801
PCT Pub. Date: Jun. 30, 2022

(65) Prior Publication Data
US 2024/0076567 A1 Mar. 7, 2024

(30) Foreign Application Priority Data

Dec. 22, 2020 (FR) ........................................ 2013911

(51) Int. Cl.
| | | |
|---|---|---|
| C10L 1/14 | (2006.01) | |
| C08F 220/18 | (2006.01) | |
| C08G 8/12 | (2006.01) | |
| C08G 8/28 | (2006.01) | |
| C08L 23/0853 | (2025.01) | |
| C09K 8/524 | (2006.01) | |
| C10L 1/195 | (2006.01) | |
| C10L 1/196 | (2006.01) | |
| C10L 1/198 | (2006.01) | |
| C10L 1/238 | (2006.01) | |
| C10L 10/16 | (2006.01) | |

(52) U.S. Cl.
CPC ........ *C10L 1/146* (2013.01); *C08F 220/1818* (2020.02); *C08G 8/12* (2013.01); *C08G 8/28* (2013.01); *C08L 23/0853* (2013.01); *C09K 8/524* (2013.01); *C10L 1/1955* (2013.01); *C10L 1/1963* (2013.01); *C10L 1/198* (2013.01); *C10L 1/238* (2013.01); *C10L 10/16* (2013.01); *C10L 2200/0259* (2013.01); *C10L 2200/0446* (2013.01); *C10L 2230/14* (2013.01); *C10L 2250/04* (2013.01)

(58) Field of Classification Search
CPC ...... C10L 1/146; C10L 1/1955; C10L 1/1963; C10L 1/198; C10L 1/238; C10L 10/16; C10L 2200/0259; C10L 2200/0446; C10L 2230/14; C10L 2250/04; C08F 220/1818; C08G 8/12; C08G 8/28; C08L 23/0853; C09K 8/524
See application file for complete search history.

(56) References Cited

U.S. PATENT DOCUMENTS

| | | | | |
|---|---|---|---|---|
| 5,743,923 | A  * | 4/1998 | Davies ..................... | C10L 1/146 44/393 |
| 2007/0051033 | A1* | 3/2007 | Martin ..................... | C10L 10/04 44/342 |
| 2013/0255139 | A1* | 10/2013 | Dolmazon ............ | C10L 1/2387 525/472 |
| 2016/0068776 | A1* | 3/2016 | Papin ....................... | C08G 8/28 525/472 |
| 2018/0079976 | A1* | 3/2018 | Tort ......................... | C08L 61/34 |
| 2021/0340453 | A1* | 11/2021 | Tort ......................... | C10L 1/146 |
| 2022/0025285 | A1* | 1/2022 | Mondkar ................ | C10L 1/198 |
| 2022/0282148 | A1* | 9/2022 | Singh ....................... | C09K 8/524 |
| 2022/0315850 | A1* | 10/2022 | Feustel ................... | C09K 8/524 |
| 2023/0039745 | A1* | 2/2023 | Tort ......................... | C09K 8/524 |

FOREIGN PATENT DOCUMENTS

| | | | |
|---|---|---|---|
| WO | WO 2012/085865 A1 | 6/2012 | |
| WO | WO 2013/189868 A1 | 12/2013 | |
| WO | WO 2014/173844 A1 | 10/2014 | |
| WO | WO 2016/162392 A1 | 10/2016 | |
| WO | WO 2022/136801 A1 | 6/2022 | |

OTHER PUBLICATIONS

Translation of the International Search Report for PCT/FR2021/052426, dated Apr. 28, 2022, 3 pages.

* cited by examiner

*Primary Examiner* — Ellen M McAvoy
(74) *Attorney, Agent, or Firm* — Quarles & Brady LLP

(57) ABSTRACT

The present invention relates to a composition of additives comprising: at least one first compound selected from: (i) copolymers of ethylene and vinyl acetate having a molar mass Mn included in the range ranging from 10,000 to 60,000 g·mol−1, optionally grafted by at least one alkyl (meth)acrylate group, the alkyl chain of which is saturated and contains from 12 to 30 carbon atoms; and (ii) polymers comprising at least 90 mol % of units derived from alkyl. (meth)acrylate monomer, the alkyl chain of which is saturated and contains from 18 to 22 carbon atoms; and at least one second compound selected from the modified alkylphenol-aldehyde resins. The invention also relates to the use of this composition of additives for lowering the viscosity of a liquid petroleum product such as a crude oil and for reducing the deposition of paraffins.

10 Claims, No Drawings

COMPOSITION OF ADDITIVES COMPRISING A COPOLYMER AND A RESIN

CROSS-REFERENCE TO RELATED APPLICATION

This application claims priority to and is a 35 U.S.C. § 371 national phase application of PCT/FR2021/052426 (WO2022/136801), filed on Dec. 22, 2021, entitled "COMPOSITION OF ADDITIVES COMPRISING A COPOLYMER AND A RESIN", which application claims priority to and the benefit of France Patent Application No. FR2013911, filed Dec. 22, 2020, the disclosures of which are incorporated herein by reference in their entirety.

TECHNICAL FIELD

The present invention relates to a composition of additives comprising at least one first compound selected from ethylene/vinyl acetate (EVA) copolymers, optionally grafted by at least one alkyl (meth)acrylate, or from polymers comprising at least 90 mol % of units derived from alkyl (meth)acrylate monomer; and at least one second compound selected from alkylphenol-aldehyde resins modified with an alkyl polyamine.

The invention also relates to the use of this composition to reduce the viscosity of a liquid petroleum product and/or to limit formation of paraffin deposits onto the walls of a duct for transporting a liquid petroleum product (pipe).

The invention further relates to a method for decreasing the viscosity of a liquid petroleum product and/or for limiting the phenomena of paraffin aggregation, and/or paraffin dispersion and/or delaying paraffin crystallisation, in a liquid petroleum product.

STATE OF PRIOR ART

Underground formations of crude petroleum, also commonly referred to as "crude mineral oil" or "crude oil", have relatively high temperatures. After extraction from the underground formation to the surface, crude oil cools down. Its cooling varies as a function of the production temperature and storage or transport conditions.

The extracted crude oil mainly comprises two product classes: maltenes and asphaltenes. The main constituents of maltenes are resins and waxes. Said waxes consist of paraffins (saturated hydrocarbon compounds) and aromatics. Paraffins consist of linear or branched alkanes and can be liquid, oily or solid.

Depending on their origin, crude oils have different proportions of waxes, which essentially consist of long-chain n-paraffins. Depending on the type of crude petroleum, the proportion of these paraffins can typically be between 1 and 30% by weight of the crude petroleum.

When extracting crude oil from a well, when temperatures drop, for example if the well is subsea or in severe weather conditions, the extracted crude oil cools down: as a result, the paraffins crystallise, typically in the form of platelets or aggregates of platelets and the (dynamic) viscosity of the oil increases. The platelet-shaped n-paraffin crystals can form a kind of house of cards structure that encloses the crude petroleum, so that the crude petroleum stops flowing, even if the predominant part is still liquid. The crystallised paraffins, and thus the highly viscous crude oil, can block filters, pumps, pipes/pipelines, plug the well, and other facilities or be deposited in tanks, thus implying a high level of cleaning. The crystallisation of these paraffins and thus the increase in viscosity can occur in oil production wells and pumping facilities. These crystallised paraffins are dramatically detrimental to the fluidity of the oil, increase its viscosity and make oil pumping and transport operations more difficult and especially more expensive because of the higher energy requirements.

This phenomenon also leads to a loss of productivity and a reduction in the lifetime of the well. Without treatment to prevent this phenomenon, drilling facilities have to be dismantled frequently to clean them and the frequency of maintenance operations on production sites represents a significant economic burden.

The main factors that favour paraffin crystallisation, and thus the increase in viscosity of the crude oil, are a drop in temperature and an increase in pressure with respect to the "initial pressure" during the extraction of the oil or during transport and/or storage.

The lowest temperature at which an oil sample still flows during cooling is called the pour point. Standardised test methods are used to measure the pour point.

Crude oils can have pour points above ambient temperature, so that oils of this type can solidify during or after production. The pour point of crude oils can be lowered by appropriate additives. This can prevent paraffins from crystallising upon cooling the crude petroleum produced. Appropriate additives firstly prevent the formation of said house of cards structures of the paraffins and thus lower the temperature at which the crude petroleum solidifies. In addition, the additives can promote formation of fine, well-crystallised and non-agglomerating paraffin crystals, so that uninterrupted oil transport is ensured. These additives are called Pour Point Depressants (PPD) or flow improvers.

To avoid problems with paraffin crystallisation, especially at low temperatures, one solution is to add additives to the crude oil, especially crystallisation modifying additives for changing the morphology and size of the crystals. These additives can also have a dispersing effect for limiting the agglomeration phenomena of paraffin crystals. Known additives are modified alkylphenol-aldehyde resins, obtained by Mannich reaction of an alkylphenol-aldehyde condensation resin with at least one aldehyde and at least one hydrocarbon compound having at least one alkylamine group, in fuel compositions as Wax Anti-Settling Additives WASA (WO2012085865), for low temperature resistance (WO2013189868) and as antioxidant agents (WO2014173844). These additives are added directly to fuel compositions to improve the properties thereof. In documents WO2012085865 and WO2013189868, the technical effect described is to prevent the formation and crystallisation, or settling, of paraffin crystals, in particular at low temperatures.

However, current pour point depressant additives and dispersants do not allow cumulation of a positive effect on the crude oil rheology (its viscosity, shear stress) as well as on paraffin deposits and aggregation.

The applicant has thus discovered that one particular combination of two additives makes it possible to lower the pour point and viscosity of crude petroleum more effectively than conventional additives, to limit the formation of paraffin deposits on the walls and to limit the paraffin aggregation.

SUMMARY OF THE INVENTION

The first object of the invention is a composition of additives comprising:
(1) at least one first compound selected from:
(i) copolymers of ethylene and vinyl acetate having a molar mass Mn in the range from 10,000 to 60,000 g·mol$^{-1}$, optionally grafted by at least one alkyl (meth) acrylate group, the alkyl chain of which is saturated and contains from 12 to 30 carbon atoms; and (ii) polymers comprising at least 90 mol % of units derived from alkyl (meth)acrylate monomer, the alkyl chain of which is saturated and contains from 18 to 22 carbon atoms;

(2) at least one second compound selected from modified alkylphenol-aldehyde resins;

said modified alkylphenol-aldehyde resins being obtainable by Mannich reaction of an alkylphenol-aldehyde condensation resin:

with at least one aldehyde and/or ketone having from 1 to 8 carbon atoms, and at least one hydrocarbon compound comprising at least one alkyl polyamine group having from 1 to 30 carbon atoms;

said alkylphenol-aldehyde condensation resin being itself obtainable by condensation of:

at least one alkylphenol substituted with at least one linear or branched alkyl group having from 1 to 30 carbon atoms, preferably from 14 to 26 carbon atoms, and even more preferably having from 18 to 22 carbon atoms; with at least one aldehyde and/or ketone having from 1 to 8 carbon atoms; and wherein the weight ratio of the amount of the first compound (1) to the amount of the second compound (2) is in the range of from 1 to 10, preferably in the range of from 1 to 6, more preferably from 1 to 5, and still more preferably from 1.5 to 4.

Another object of the invention is the use of the composition of additives to reduce the dynamic viscosity of a liquid petroleum product, preferably at a temperature of less than or equal to 30° C., more preferably less than or equal to 25° C., more preferably less than or equal to 20° C., more preferably less than or equal to 15° C., more preferably less than or equal to 10° C., more preferably less than or equal to 5° C., even more preferably less than or equal to 0° C., better less than or equal to −5° C., and even still better less than or equal to −15° C.; and/or to limit the phenomena of paraffin aggregation and/or to disperse them and/or to delay their crystallisation in a liquid petroleum product; and/or to lower the pour point of a liquid petroleum product; and/or to limit the formation of paraffin deposits on the walls of a duct for transporting a liquid petroleum product (pipe).

Preferably, the liquid petroleum product is a diesel, crude petroleum or a heavy fuel oil, preferably crude petroleum.

According to one preferred embodiment of the invention, the polymers (ii) comprise at least 95 mol %, preferably at least 98%, and more preferably 100% of units derived from alkyl (meth)acrylate monomer, the alkyl chain of which is saturated and contains from 18 to 22 carbon atoms.

According to one preferred embodiment of the invention, the modified alkylphenol-aldehyde resin is obtainable from p-nonylphenol, formaldehyde and at least one hydrocarbon compound having at least one alkyl polyamine group.

According to one preferred embodiment of the invention, said modified alkylphenol-aldehyde resin is obtainable by Mannich reaction of an alkylphenol-aldehyde condensation resin:

with at least one aldehyde and/or ketone having from 1 to 4 carbon atoms; and and at least one hydrocarbon compound comprising at least one alkyl polyamine group having from 4 to 30 carbon atoms, said alkylphenol-aldehyde condensation resin being itself obtainable by condensation:

of a monoalkylphenol with at least one aldehyde and/or one ketone having from 1 to 4 carbon atoms.

According to one preferred embodiment of the invention, the modified alkylphenol-aldehyde resin is obtainable from p-nonylphenol, formaldehyde and at least one hydrocarbon compound.

According to one preferred embodiment of the invention, the modified alkylphenol-aldehyde resin is obtainable from p-nonylphenol, and the average number of phenol rings per modified p-nonylphenol-aldehyde resin molecule is in the range of from 6 to 25, preferably from 8 to 17, and even more preferably from 9 to 16.

According to one preferred embodiment of the invention, the hydrocarbon compound having at least one alkyl polyamine group comprises at least two primary amine groups and a fatty chain having from 12 to 24 carbon atoms, preferably from 12 to 22 carbon atoms, and preferably said hydrocarbon compound is tallow dipropylenetriamine.

According to one preferred embodiment of the invention, the composition of additives further comprises an organic solvent, preferably selected from an aromatic solvent, such as xylene; a liquid hydrocarbon fraction such as a diesel fraction; and mixtures of such solvents.

According to one preferred embodiment of the invention, the first polymeric compound (1) includes in its main chain an average number of acrylate units or ethylene units per polymer molecule in the range of from 5 to 30, preferably from 8 to 25, and even more preferably from 9 to 15.

According to one preferred embodiment of the invention, the modified alkylphenol-aldehyde resin is introduced into the composition of additives (comprising additives 1 and 2 and the optional solvent) in an amount of between 100 and 20,000 ppm by weight, preferably between 1000 and 15,000 ppm, preferably between 2000 and 12,000 ppm, preferably between 3000 and 10,000 ppm, preferably between 4000 and 5000 ppm by weight relative to the total weight of the composition.

According to another embodiment, the invention relates to a method for reducing the viscosity of a liquid petroleum product and/or for limiting the phenomena of paraffin aggregation, and/or paraffin dispersion and/or delaying paraffin crystallisation, in a liquid petroleum product, comprising at least the following steps:

preparing a composition of additives as defined above, and then introducing said composition of additives into a liquid petroleum product, preferably crude petroleum.

Preferably, the composition of additives is introduced into the liquid petroleum product in an amount such that the total content of the two compounds (1) and (2) is between 10 and 2500 ppm by weight, preferably between 20 and 1800 ppm, preferably between 50 and 1500 ppm, preferably between 70 and 1000 ppm, more preferably between 100 and 800 ppm, more preferably between 400 and 700 ppm, more preferably between 550 and 650 ppm by weight.

In the following, and unless otherwise indicated, the bounds of an interval of values are included in this interval, especially in the terms "between" and "ranging/ranges from . . . to . . . ".

Furthermore, the expressions "at least one" and "at least" used in the present description are respectively equivalent to the expressions "one or more" and "greater than or equal to".

In the present invention, the number average molar mass ($M_n$) and mass average molar mass ($M_w$) are determined by static exclusion chromatography or Gel Permeation chromatography (GPC).

DETAILED DESCRIPTION OF THE INVENTION

The First Compound

The composition according to the invention comprises a first compound (1) selected from:
(i) copolymers of ethylene and vinyl acetate having a molar mass Mn in the range from 10,000 to 60,000 g·mol$^{-1}$, optionally grafted by at least one alkyl (meth) acrylate, the alkyl chain of which is saturated and contains from 12 to 30 carbon atoms; and
(ii) polymers comprising at least 90 mol % of units derived from alkyl (meth)acrylate monomer, the alkyl chain of which is saturated and contains from 18 to 22 carbon atoms.

In one preferred embodiment, the alkyl (meth)acrylate grafts of polymers (i) include a saturated alkyl chain having from 14 to 26 carbon atoms, and preferably having from 18 to 22 carbon atoms.

Preferably, the polymers (ii) comprise at least 95 mol %, preferably at least 98%, and better 100% of units derived from said alkyl (meth)acrylate monomer.

The Ungrafted Copolymer (i)

The invention makes use of a copolymer comprising a repeating unit of the following formula (I):

(I)

This unit is derived from the ethylene monomer.

It preferably represents from 75 to 95 mol %, based on the total mole number of units of the copolymer.

Preferably, the copolymer comprises from 77 to 92 mol % of units of the formula (I) relative to the total mole number of units of the copolymer, more preferably from 80 to 88 mol %, and still more preferably from 82 to 87 mol %.

The copolymer (i) also comprises one or more vinyl acetate repeating unit(s) having the following formula (II):

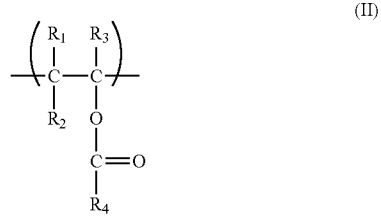

(II)

wherein
$R_1$, $R_2$, and $R_3$ represent a hydrogen atom, and $R_4$ represents a $C_1$ alkyl group.

The unit(s) of the formula (II) preferably represent(s) from 5 to 25 mol %, based on the total mole number of units of the copolymer.

Preferably, the copolymer (i) comprises from 8 to 23 mol % of units of the formula (II), more preferably from 12 to 20 mol % and even more preferably from 13 to 18 mol %.

The units of the formula (II) are derived from monomers of the C1 carboxylic acid ester and vinyl alcohols, that is the vinyl acetate ester of the following formula (IIA):

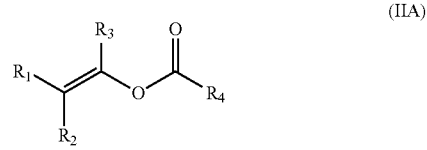

(IIA)

wherein $R_1$, $R_2$, $R_3$ and $R_4$ are as defined above.

The copolymer (i) employed in the present invention is advantageously a random copolymer.

The molar mass Mn of the ungrafted copolymers (i) according to the invention is in the range from 10,000 to 60,000 g·mol$^{-1}$, preferably from 10,000 to 40,000 g·mol$^{-1}$, better from 10,000 to 20,000 g·mol$^{-1}$.

The molar mass Mw of the ungrafted copolymers (i) according to the invention is preferably in the range from 31,000 to 190,000 g·mol$^{-1}$, preferably from 31,000 to 125,000 g·mol$^{-1}$, better from 31,000 to 62,000 g·mol$^{-1}$.

When it is not grafted, the copolymer (i) employed in the present invention contains only units of the formula (I) and units of the formula (II).

The copolymers (i) can be prepared according to polymerisation methods known per se. The different polymerisation techniques and conditions are widely described in the literature and are within the general knowledge of the skilled person.

In particular, they can be synthesised by conventional radical polymerisation as described in document U.S. Pat. No. 3,627,838: this is generally done by mixing the different monomers in an appropriate solvent, such as benzene, and the copolymerisation is initiated by means of a radical polymerisation initiator, such as a peroxide like tert-butyl hydroperoxide. The copolymerisation reaction temperature is preferably between 260 and 350° C., even more preferably 300° C. and the pressure is preferably from 10 bar to 140 bar, preferably from 40 bar to 70 bar.

In the case where the copolymer is prepared by conventional radical polymerisation, it may be necessary to proceed after the polymerisation proper with purification by any appropriate separation technique (especially by chromatography) so as to isolate a copolymer having the required characteristics in terms of molar mass and dispersity.

According to one preferred embodiment, the copolymer according to the invention is prepared using Controlled Radical Polymerisation (CRP) techniques. Controlled radical polymerisation techniques, known per se, have the advantage that they can lead directly to copolymers with the required molar mass and dispersity characteristics, so that a separative purification may, depending on the conditions used, not be necessary.

Especially noteworthy among these techniques are reversible termination or degenerative transfer governed polymerisations. Among these PRC techniques, those controlled by degenerative transfer are preferred, and among these, Reversible Addition-Fragmentation Chain Transfer (RAFT) radical polymerisation is even more preferred.

The Graft Copolymer (i)

In another embodiment, the copolymer (i) employed in the present invention is grafted by at least one alkyl (meth) acrylate, the alkyl chain of which is saturated and contains from 12 to 30 carbon atoms.

In this embodiment, the copolymer (i) comprises a base backbone consisting of the ungrafted copolymer (i) as described above, onto which at least one alkyl (meth) acrylate, the alkyl chain of which is saturated and contains from 12 to 30 carbon atoms, is grafted. Such a graft has typically the following formula (III):

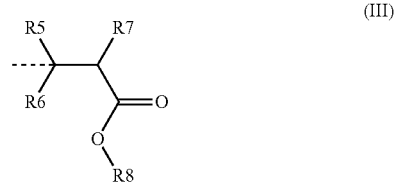

(III)

wherein
$R_5$, $R_6$, which may be identical or different, represent a hydrogen atom or a $C_1$ to $C_4$ alkyl group; $R_7$ represents a hydrogen atom or a methyl group and $R_8$ represents a $C_{12}$ to $C_{30}$ saturated alkyl chain.

In one preferred embodiment, the alkyl (meth)acrylate graft(s) include(s) at least one saturated alkyl chain having 14 to 26 carbon atoms, and preferably having 18 to 22 carbon atoms.

According to one preferred embodiment, $R_5$, $R_6$ and $R_7$, which may be identical or different, represent a hydrogen atom or a methyl group. Particularly preferably, $R_5$, $R_6$ and $R_7$ all represent a hydrogen atom; or $R_5$, $R_6$ represent a hydrogen atom and $R_7$ represents a methyl group.

According to an also preferred embodiment, $R_8$ represents a linear saturated alkyl chain. More preferably, $R_8$ is selected from n-$C_{18}H_{37}$, n-$C_{19}H_{39}$ n-$C_{20}H_{41}$, n-$C_{21}H_{43}$, and n-$C_{22}H_{45}$ groups.

According to one particularly preferred embodiment:
$R_5$, $R_6$, and $R_7$ all represent a hydrogen atom, and
$R_8$ is selected from n-$C_{18}H_{37}$, n-$C_{19}H_{39}$ n-$C_{20}H_{41}$, n-$C_{21}H_{43}$, and n-$C_{22}H_{45}$ groups.

Highly preferably, $R_8$ is selected from a mixture of n-$C_{18}H_{37}$, n-$C_{20}H_{41}$, and n-$C_{22}H_{45}$ groups, that is the alkyl (meth)acrylate is behenyl acrylate.

Grafting by the alkyl (meth)acrylate function can be carried out by any grafting method known per se, such as grafting by the classical radical route or controlled radical route, or by ATRP (Atom Transfer Radical Polymerisation).

The different grafting techniques and conditions are widely described in the literature and are within the general knowledge of the skilled person.

Grafting by the radical route is particularly preferred. Grafting is carried out at the vinyl acetate: either on the methyl group of the acetate or on the tertiary carbons of the copolymer backbone, depending on the nature of the polymerisation initiator.

If the initiator is benzoyl peroxide, grafting is rather initiated on the methyl group of the acetate.

If the initiator is dicumyl peroxide, grafting is rather initiated on the tertiary carbons of the copolymer backbone, or the methyl group of the acetate.

In the case of the grafted copolymer (i), the unit of the formula (I) preferably represents from 71 to 94 mol %, based on the total mole number of units of the copolymer, more preferably, the copolymer comprises from 78 to 88 mol % of units of the formula (I), based on the total mole number of units of the copolymer, even more preferably from 80 to 88 mol %, and even better from 82 to 87 mol %.

And, the unit(s) of the formula (II) preferably represent(s) from 5 to 25 mol %, based on the total mole number of units of the copolymer, more preferably, the copolymer comprises from 10 to 15 mol % of units of the formula (II).

The graft(s) of the formula (III) preferably represent(s) from 1 to 4 mol %, based on the total mole number of units of the copolymer, more preferably, the copolymer comprises from 1.5 to 3 mol % of units of the formula (II).

The molar mass Mn of the grafted copolymers (i) according to the invention is preferably in the range from 12,000 to 50,000 g·mol$^{-1}$, preferably from 12,000 to 40,000 g·mol$^{-1}$, more preferably from 12,000 to 32,000 g·mol$^{-1}$.

The molar mass Mw of the graft copolymers (i) according to the invention is preferably in the range from 23,500 to 230,000 g·mol$^{-1}$, preferably from 46,500 to 190,000 g·mol$^{-1}$, better from 55,000 to 150,000 g·mol$^{-1}$.

The Polymer (ii)

The first compound of the composition of additives may also be selected from polymers (ii) comprising at least 90 mol % of units derived from alkyl (meth)acrylate monomer, the alkyl chain of which is saturated and contains from 18 to 22 carbon atoms.

The alkyl (meth)acrylate monomers have the following formula (IV):

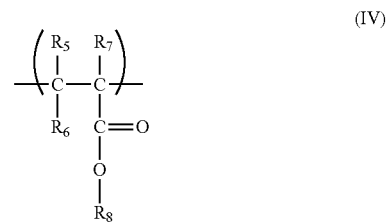

(IV)

wherein
$R_5$, $R_6$, which may be identical or different, represent a hydrogen atom or a $C_1$ to $C_4$ alkyl group;
$R_7$ represents a hydrogen atom or a methyl group; and
$R_8$ represents a saturated $C_{18}$ to $C_{22}$ alkyl chain.

According to one preferred embodiment, $R_5$, $R_6$ and $R_7$, which may be identical or different, represent a hydrogen atom or a methyl group. Particularly preferably, $R_5$, $R_6$ and $R_7$ all represent a hydrogen atom; or $R_5$, $R_6$ represent a hydrogen atom and $R_7$ represents a methyl group.

According to an also preferred embodiment, $R_8$ represents a linear saturated alkyl chain. More preferably, $R_8$ is selected from n-$C_{18}H_{37}$, n-$C_{19}H_{39}$ n-$C_{20}H_{41}$, n-$C_{21}H_{43}$, and n-$C_{22}H_{45}$ groups.

According to one particularly preferred embodiment:
$R_5$, $R_6$, and $R_7$ all represent a hydrogen atom, and
$R_8$ is selected from n-$C_{18}H_{37}$, n-$C_{19}H_{39}$ n-$C_{20}H_{41}$, n-$C_{21}H_{43}$, and n-$C_{22}H_{45}$.

Highly preferably, $R_8$ is selected from a mixture of n-$C_{18}H_{37}$, n-$C_{20}H_{41}$, and n-$C_{22}H_{45}$ groups. Also preferably, the alkyl (meth)acrylate is behenyl acrylate.

In one preferred embodiment, the polymers (ii) comprise at least 95 mol %, preferably at least 98%, and better 100% of units derived from alkyl (meth)acrylate monomer, the alkyl chain of which is saturated and contains from 18 to 22 carbon atoms.

The Second Compound (Resin)

The composition according to the invention comprises a second compound selected from modified alkylphenol-aldehyde resins; said modified alkylphenol-aldehyde resin being obtainable by Mannich reaction of an alkylphenol-aldehyde condensation resin
  with at least one aldehyde and/or ketone having from 1 to 8 carbon atoms, and
  at least one hydrocarbon compound having at least one alkyl polyamine group, having from 1 to 30 carbon atoms;
said alkylphenol-aldehyde condensation resin being itself obtainable by condensing:
  at least one alkylphenol substituted with at least one linear or branched alkyl group having from 1 to 30 carbon atoms, with
  at least one aldehyde and/or one ketone having from 1 to 8 carbon atoms.

In one preferred embodiment, said modified alkylphenol-aldehyde resin is obtainable by Mannich reaction of an alkylphenol-aldehyde condensation resin:
  with at least one aldehyde and/or ketone having from 1 to 4 carbon atoms;
  and at least one hydrocarbon compound comprising at least one alkyl polyamine group having from 4 to 30 carbon atoms,
said alkylphenol-aldehyde condensation resin being itself obtainable by condensation:
  of a monoalkylphenol, with
  at least one aldehyde and/or one ketone having from 1 to 4 carbon atoms.

The alkylphenol-aldehyde condensation resin may be selected from any resin of this type already known and especially those described in documents EP857776, EP1584673.

The modified alkylphenol-aldehyde resin according to the invention is advantageously obtained from p-nonylphenol, formaldehyde and at least one hydrocarbon compound comprising at least one alkyl polyamine group.

According to one embodiment, the resin is obtainable from p-nonylphenol and the average number of phenol rings per modified p-nonylphenol-aldehyde resin molecule is in the range of from 6 to 25, preferably from 8 to 17, and even more preferably from 9 to 16.

The number of phenol rings can be determined by Nuclear Magnetic Resonance (NMR) or Gel Permeation Chromatography (GPC).

Advantageously, the modified alkylphenol-aldehyde resin is obtained by making use of the same aldehyde or ketone in both steps of preparing it.

According to one preferred embodiment, the modified alkylphenol-aldehyde resin may be obtained from at least one aldehyde and/or ketone selected from formaldehyde, acetaldehyde, propionaldehyde, butyraldehyde, 2-ethylhexanal, benzaldehyde and/or acetone. Preferably, the modified alkylphenol-aldehyde resin may be obtained from at least one aldehyde, preferably at least formaldehyde (or methanal).

According to one particular embodiment, the modified alkylphenol-aldehyde resin is obtained from at least one hydrocarbon compound having at least one alkyl polyamine group having at least two primary and/or secondary amine groups. In particular, the alkyl polyamine is advantageously selected from primary or secondary polyamines substituted with, respectively, one or two alkyl groups comprising, preferably, from 12 to 24 carbon atoms, more preferably from 12 to 22 carbon atoms.

According to one preferred alternative, the modified alkylphenol-aldehyde resin is obtained from at least one hydrocarbon compound having at least one alkyl polyamine group having at least two primary amine groups.

In particular, the modified alkylphenol-aldehyde resin can advantageously be obtained from at least one alkyl polyamine in which all the amine groups are primary amines.

According to another preferred alternative, the modified alkylphenol-aldehyde resin is obtained from at least one alkyl polyamine having at least two primary amine groups, preferably three primary amine groups, and comprising a fatty chain having from 12 to 24 carbon atoms, preferably from 12 to 22 carbon atoms.

The alkyl polyamine is preferably with a fatty chain having from 12 to 24 carbon atoms, preferably from 12 to 22 carbon atoms.

Commercial alkyl polyamines are generally not pure compounds but mixtures. Suitable commercial alkyl polyamines include especially fatty chain alkyl polyamines marketed under the names Trinoram®, Duomeen®, Dinoram®, Triameen®, Armeen®, Polyram®, Lilamin® and Cemulcat®.

A preferred example that can be mentioned is Trinoram®S which is a tallow dipropylenetriamine, also known as N-(Tallowalkyl)dipropylenetriamine (CAS 61791-57-9).

The Composition of Additives

The composition according to the invention is such that the weight ratio of the amount of the first compound (1) to the amount of the second compound (2) is in the range from 1 to 10, preferably from 1 to 6, more preferably from 1 to 5, and still better from 1.5 to 4.

According to one embodiment, the composition further comprises an organic solvent.

By way of example, the organic solvent is selected from aliphatic and/or aromatic hydrocarbons, and/or selected from hydrocarbon mixtures, for example gasoline, diesel, paraffin fractions, decane, pentadecane, toluene, xylene, ethylbenzene, polyethers.

Preferably, the solvent mixture is an aromatic solvent mixture comprising aromatic compounds having 10 carbon atoms, and/or aromatic compounds having 9 carbon atoms, and/or xylene.

In one embodiment, the compound (2) is introduced into the composition previously diluted in a solvent mixture: 50% by volume of an organic solvent listed below such as Solvarex, and 50% by volume of xylene.

In this case, preferably, the aromatic solvent mixture is introduced into the solution of modified alkylphenol-aldehyde resin (which already contains 50% vol solvent) and (co)polymers in an amount by volume between 5 and 90% v/v with respect to the aromatic solvent mixture (C10, C9 and/or xylene), preferably between 10-80% v/v, even more preferably between 30-80%v/v, and highly preferably between 35-70% v/v.

The organic solvent comprises a majority (at least 80% by weight) of aromatic compounds typically having 10 carbon atoms. By way of example, the solvent is selected from: Solvarex 10®, Solvarex 10 LN®, Solvent Naphta®, Shellsol AB®, Shellsol D®, Solvesso 150®, Solvesso 150 ND®.

Preferably, the first compound (1) is present in the composition of additives in an amount of between 2 and 50% by weight, preferably between 3 and 40, more preferably between 5 and 35%, by weight based on the total weight of the composition.

Preferably, the second compound (2) (the modified alkylphenol-aldehyde resin) is present in the composition of additives in an amount of between 1 and 50% by weight, preferably between 2 and 40%, more preferably between 5 and 30%, by weight based on the total weight of the composition.

Other Additives in the Composition

The composition of additives may also comprise one or more additional additive(s), different from said additives according to the invention.

Additional additives which may be incorporated in the composition include dispersants/detergents, corrosion inhibitors, biocides, demulsifiers or anti-foam agents, paraffin deposit inhibitors, pour point depressants, wax anti-settling additives for paraffins, $H_2S$ scavengers, organic deposit inhibitors such as naphthenic acids, mineral deposit inhibitors, markers, heat stabilisers, emulsifiers, friction reducing agents, surfactants, and mixtures thereof.

Other additional additives include, in particular:
a) anti-foam additives, especially selected from (but not limited to) polysiloxanes, oxyalkylated polysiloxanes, and fatty acid amides derived from vegetable or animal oils;
b) detergent and/or anti-corrosion additives, especially selected from (but not limited to) the group consisting of amines, succinimides, alkenylsuccinimides, polyalkylamines, polyalkyl polyamines, polyetheramines; imidazolines; and quaternary ammonium salts derived from the abovementioned compounds;
c) lubricity additives or anti-wear agents, especially selected from (but not limited to) the group consisting of fatty acids and ester or amide derivatives thereof, especially glycerol monooleate, and mono- and polycyclic carboxylic acid derivatives;
d) crystallisation modifying additives, paraffin deposition inhibiting additives, pour point depressant additives; low temperature rheology modifiers such as ethylene/vinyl propionate (EVP) copolymers, ethylene/vinyl acetate/vinyl versatate (EA/AA/EOVA) terpolymers; ethylene/vinyl acetate/alkyl acrylate terpolymers; polyacrylates; acrylates/vinyl acetate/maleic anhydride terpolymers; amidated maleic anhydride/alkyl(meth)acrylate copolymers obtainable by reacting a maleic anhydride/alkyl(meth)acrylate copolymer and an alkylamine or polyalkylamine having a hydrocarbon chain of from 4 to 30 carbon atoms, preferably of from 12 to 24 carbon atoms; amidated alpha-olefin/maleic anhydride copolymers obtainable by reacting an alpha-olefin/maleic anhydride copolymer and an alkylamine or polyalkylamine, it being possible for the alpha-olefin to be selected from among C10-C50, preferably C16-C20, alpha-olefins and the alkylamine or polyalkylamine advantageously having a hydrocarbon chain of from 4 to 30 carbon atoms, preferably of from 12 to 24 carbon atoms. By way of example of terpolymers, those described in EP01692196, WO2009106743, WO2009106744, U.S. Pat. Nos. 4,758,365 and 4,178,951 may be mentioned,
e) acidity neutralisers.

According to one embodiment, the composition of additives comprises a dispersing agent. This embodiment is preferred when said composition of additives comprises a solvent such as especially a liquid hydrocarbon fraction.

By way of example, the dispersant is selected from surfactants, sulphonates and sulphonic acids (of naphthalene, dodecylbenzene, etc.), etc.

The Petroleum Product

According to one embodiment, the composition of additives is introduced into a liquid petroleum product in an amount such that the total content of the two compounds (1) and (2) is between 10 and 2500 ppm by weight, preferably between 20 and 1800 ppm, preferably between 50 and 1500 ppm, preferably between 70 and 1000 ppm, preferably between 100 and 800 ppm, more preferably from 400 to 700 ppm, more preferably from 550 to 650 ppm by weight, based on the total weight of the petroleum product.

According to one embodiment, the composition of additives is introduced into a liquid petroleum product in an amount such that the content of compound (1) is between 5 and 2495 ppm by weight, preferably between 10 and 2200 ppm, preferably between 30 and 2000 ppm, preferably between 100 and 1500 ppm, by weight, based on the total weight of the petroleum product.

According to one embodiment, the composition of additives is introduced into a liquid petroleum product in such an amount that the content of compound (2) is between 5 and 1000 ppm by weight, preferably between 10 and 800 ppm, preferably between 20 and 700 ppm, preferably between 10 and 500 ppm by weight, preferably between 10 and 300 ppm by weight, based on the total weight of the petroleum product.

In the invention, the expression "liquid petroleum product" is synonymous with crude oil or crude petroleum (extracted from a petroleum well, or in a petroleum well, or in a pipeline . . . ), fuel (preferably diesel), fuel oil/heavy fuel etc.

By "liquid" petroleum product", it is meant that such a petroleum product is in a liquid state at room temperature (25° C.) and atmospheric pressure ($1.03 \times 10^5$ Pa).

The liquid petroleum product is preferably a crude oil or crude petroleum.

The crude oil (or crude petroleum) is derived from a natural reserve or rock formation, preferably underground, or from an underground ore. It is extracted via a well or "wellbore", which corresponds to a hole or well penetrating the rock formation containing the oil.

Raw oils from the well may be alone or in a mixture with other components, such as water, gas and/or brine, or other additives used during drilling (anti-limescale, etc.).

The Use

Another object of the invention is the use of the composition of additives, to reduce the dynamic viscosity of a liquid petroleum product, preferably at a temperature of less than or equal to 30° C., more preferably less than or equal to 25° C., more preferably less than or equal to 20° C., more preferably less than or equal to 15° C., more preferably less than or equal to 10° C., more preferably less than or equal to 5° C., even more preferably less than or equal to 0° C., better still less than or equal to −5° C., and even better still less than or equal to −15° C.

The dynamic viscosity, well known to the skilled person, characterises the resistance to laminar flow of an incompressible fluid.

The viscosity is measured with an Anton Paar MCR 302 rheometer, 27 mm coaxial cylinder geometry, CSR (controlled shear rate) drive: the flow curves are determined and the viscosity is obtained. This determination method is well known to the skilled person.

The composition of additives according to the invention is also used to limit paraffin aggregation/crystallisation phenomena; and/or to disperse paraffins and/or delay their crystallisation in a liquid petroleum product.

Another object of the invention is the use of the composition of additives to limit the formation of paraffin deposits onto the walls of a duct for transporting a liquid petroleum product (pipe).

The composition of additives according to the invention is also used to lower the pour point of a liquid petroleum product. The pour point is the minimum temperature at which a substance (crude petroleum) still flows. It is measured according to ASTM D5853 standard.

The composition of additives according to the invention is also used to decrease the shear stress, the shear threshold, and/or the viscosity when flowing a liquid petroleum product, preferably at a temperature of 85° C. or less, more preferably 75° C. or less, even more preferably 65° C. or less, better 55° C. or less, more preferably 45° C. or less, more preferably 35° C. or less, more preferably 25° C. or less, more preferably 10° C. or less, more preferably 5° C. or less, even more preferably 0° C. or less, better −5° C. or less, and still better −15° C. or less.

Shear stress is the ratio of a tangential force applied to a surface to the cross-sectional area tangential to the force. Shear stress is measured with an Anton Paar MCR 302 rheometer, 27 mm coaxial cylinder geometry, CSR drive. From the flow curves the shear stress can be deduced.

The liquid petroleum product is preferably a diesel, crude petroleum or a heavy fuel oil, preferably crude petroleum.

The invention aims at facilitating extraction of crude oil, especially by avoiding/inhibiting/delaying/reducing crystallisation and thus the paraffin aggregation phenomena. This phenomenon can affect compositions with a wide range of paraffin contents.

The Method for Reducing the Viscosity of a Liquid Petroleum Product

The invention also relates to a method for reducing the viscosity of a liquid petroleum product and/or for limiting the phenomena of paraffin aggregation, and/or for paraffin dispersion and/or for paraffin crystallisation delaying, in a liquid petroleum product, comprising at least the following steps:

preparing a composition of additives as defined above, and then introducing said composition of additives into a liquid petroleum product, preferably crude petroleum.

The introduction of said composition of additives into the liquid petroleum product is performed at a sufficiently high temperature, that is when the paraffins are still dissolved in the petroleum product stock, that is between 45 and 90° C., preferably between 60 and 90° C.

According to the method of the invention, said composition of additives is introduced into a liquid petroleum product in an amount such that the total content of the two compounds (1) and (2) is between 10 and 2500 ppm by weight, preferably between 20 and 1800 ppm, preferably between 50 and 1500 ppm, preferably between 70 and 1000 ppm, preferably between 100 and 800 ppm, more preferably, from 400 to 700 ppm, more preferably from 550 to 650 ppm by weight.

The following examples serve to illustrate the invention without being limiting.

EXAMPLES

In the following examples, the contents expressed in ppm correspond to ppm by mass. The expression "am" means active material.

Example 1: Additives Used

The examples make use of the following additives:
As the first compound (1) according to the invention:
a homopolymer obtained by radical polymerisation of behenyl acrylate monomers, and whose molar mass Mw is 20,000 g/mol, hereinafter referred to as C1; the compound C1 consists of a solution of the polyacrylate polymer at a concentration of 32% by weight in a $C_{10}$ aromatic solvent;

an ungrafted ethylene-vinyl acetate (EVA) copolymer, comprising 33% by weight of vinyl acetate, and whose molar masses are Mn=15 440 g/mol, Mw=48 025 g/mol (polydispersity index Ip=3.1), hereinafter referred to as C2; the compound C2 consists of a solution of the EVA copolymer at a concentration of 20% by weight in a $C_{10}$ aromatic solvent;

a grafted ethylene-vinyl acetate (EVA) copolymer, comprising 5% by weight of vinyl acetate and 74% by weight of behenyl acrylate, and whose molar masses are Mn=24 471 g/mol, Mw=118 528 g/mol (polydispersity index Ip=4.8), hereinafter referred to as C3; the compound C3 consists of a solution of the grafted EVA copolymer at a concentration of 38% by weight in an aromatic $C_{10}$ solvent.

As the second compound (2) according to the invention: a modified alkylphenol-aldehyde resin, hereinafter referred to as Res1, the synthesis method of which is detailed below.

By way of comparison, the examples also make use of a polyisobutylene succinimide additive, hereinafter referred to as PIBSI, obtained by condensation of succinic anhydride grafted by a polyisobutylene group having molecular mass Mw of 1000 g/mol with tetraethylenepentamine.

The number average molecular mass (Mn) and mass average molecular mass (Mw) have been determined on an AGILENT PL-GPC50-Plus gel permeation steric exclusion chromatography chain. The elution solvent is tetrahydrofuran and the standards consist of polystyrenes.

Synthesis of the Modified Alkylphenol-Aldehyde Resin (Res1)

Step 1: In a first step, an alkylphenol-aldehyde resin is prepared by condensation of para-nonylphenol and formaldehyde (for example according to the procedure described in EP857776), with a viscosity at 50° C. of between 1800 and 4800 mPa·s (viscosity measured at 50° C. with the aid of a dynamic rheometer with a shear rate of 10 $s^{-1}$ on the resin diluted with 30% by weight of aromatic solvent (Solvesso 150®)).

Step 2: In a second step, the alkylphenol-aldehyde resin from the first step is modified by Mannich reaction by adding 2 molar equivalents of formaldehyde and 2 molar equivalents of tallow dipropylenetriamine, known as N-(Tallowalkyl)dipropylenetriamine and marketed for example as Trinoram S®, based on the alkylphenol-aldehyde resin from the first step.

The characteristics of the resin (named Res1) obtained at the end of step 2 are listed in the following Table 1:

TABLE 1

| Alkyl polyamine | Solids content (1 g/ 30 min/200° C.) | Kinematic viscosity ($mm^2/s$) (1) | $N_{Phe}$ (2) |
|---|---|---|---|
| Trinoram S ® | 50% | 120 | 14.1 |

(1) Kinematic viscosity measured in accordance with NF EN ISO3405 standard at 40° C., on the resin diluted with 50 weight % of Solvesso 150 ® solvent,
(2) Evaluation of the average number of phenol rings per resin molecule or $N_{Phe}$: measured by proton nuclear magnetic resonance.

Example 2: Compositions of Additives Comprising C1+Res1

2.1 Shear Stress Measurements

The compound C1 and/or resin Res 1 have been incorporated into a crude petroleum, and the shear stress at different temperatures has been measured with an Anton Paar MCR 302 rheometer, 27 mm coaxial cylinder geometry, CSR drive. It is measured at a shear rate of 90 s$^{-1}$.

The shear stress values obtained (expressed in Pa) are gathered in Table 2 below.

TABLE 2

| Temperature | Comparative 1: Non-additivated crude petroleum | Comparative 2: Crude petroleum + 1000 ppm C1 (that is in am 320 ppm) | Invention: Crude petroleum + 1000 ppm additive = 800 ppm C1 + 200 ppm Res 1; that is in am: 256 ppm C1 + 100 ppm Res.1; weight ratio am C1/Res1 of 2.56:1 |
|---|---|---|---|
| 65° C. | 4.61 | 4.31 | 3.96 |
| 55° C. | 7.93 | 7.10 | 6.39 |
| 45° C. | 13.68 | 12.05 | 10.78 |
| 35° C. | 23.63 | 20.64 | 18.25 |
| 25° C. | 48.97 | 40.14 | 34.83 |

The above results show that the shear stress of crude petroleum comprising the composition of additives according to the invention is lower than the shear stresses of the crude petroleum alone (Comparative 1) and the crude petroleum and C1 compound mixture (Comparative 2).

2.2. Dynamic Viscosity Measurements

The following compositions of additives according to the invention have been prepared from compound C1 and resin Res1, diluted in an organic solvent consisting of a mixture of C9 aromatic compounds and xylene:
- Composition of additives A1: C1+Res 1 with a C1/Res 1 weight ratio of 4:1 (that is in am 2.56:1);
- Composition of additives A2: C1+Res 1 with a C1/Res 1 weight ratio of 3:1 (that is in am 1.92:1).

Each composition comprises 35% by weight of additives and 65% by weight of organic solvent.

These compositions A1 and A2 have been incorporated into crude petroleum, and the dynamic viscosity has been measured with an Anton Paar MCR 302 rheometer, 27 mm coaxial cylinder geometry, CSR drive. It is measured at a shear rate of 38 s$^{-1}$.

The viscosity values obtained (expressed in mPa·s) are gathered in Table 3 below.

TABLE 3

| | Viscosity at 23° C. | Viscosity at 18° C. |
|---|---|---|
| Comparative: non-additivated crude petroleum | 2540 | 5290 |
| Invention: crude petroleum + 2000 ppm A1 | 2214 | 5111 |
| Invention: crude petroleum + 2000 ppm A2 | 2113 | 4688 |

The above results show that the dynamic viscosity of crude petroleum comprising the compositions of additives according to the invention is lower than the dynamic viscosity of crude petroleum alone (comparative).

Tests have also been carried out, by comparing composition A1 with Res.1 resin alone. The dynamic viscosity has been measured with an Anton Paar MCR 302 rheometer, 27 mm coaxial cylinder geometry, CSR drive. It has been measured at a shear rate of 38 s$^{-1}$.

The viscosity values obtained (expressed in mPa·s) are gathered in Table 4 below.

TABLE 4

| | Viscosity at 23° C. | Viscosity at 18° C. |
|---|---|---|
| Comparative: non-additivated crude petroleum | 2540 | 5290 |
| Comparative: crude petroleum + 520 ppm Res.1 (260 ppm am) | 2240 | 4820 |
| Comparative: crude petroleum + 1300 ppm Res.1 (650 ppm am) | 2370 | 4950 |
| Invention: crude petroleum + 1040 ppm C1 + 260 ppm Res.1 (332.8 ppm am C1 + 130 ppm am Res1; weight ratio C1/Res1 = 2.56:1) | 2170 | 4690 |

The above results show that the addition of the resin alone does not sufficiently lower the viscosity, and that an increase in the resin content tends to degrade the viscosity. It is the synergy between both compounds C1 and Res1 that allows the viscosity to be lowered substantially.

Example 3: Compositions of Additives Comprising C2+Res1

3.1. Dynamic Viscosity Measurements

The additives C2, Res 1 and PIBSI have been incorporated into crude petroleum, and the dynamic viscosity at different temperatures has been measured with an Anton Paar MCR 302 rheometer, 27 mm coaxial cylinder geometry, CSR drive. It is measured at a fixed shear rate of 0.02 s$^{-1}$.

The viscosity values obtained (expressed in Pa·s) are gathered in Table 5 below.

TABLE 5

| Temperature | Crude petroleum | Crude petroleum + 500 ppm C2 (that is 100 ppm am) | Crude petroleum + 400 ppm C2 + 100 ppm PIBSI (that is in am: 80 ppm C2 + 50 ppm PIBSI; weight ratio 1.6:1) | Crude petroleum + 400 ppm C2 + 100 ppm Res.1 (that is in am: 80 ppm C2 + 50 ppm Res1; weight ratio 1.6:1) |
|---|---|---|---|---|
| 25° C. | 124.38 | 3.43 | 8.74 | 2.11 |
| 20° C. | 448.83 | 38.03 | 48.16 | 25.55 |
| 15° C. | 2029.30 | 128.93 | 164.17 | 94.16 |
| 10° C. | 4738.80 | 269.10 | 584.25 | 258.30 |

Measurements have also been made at a fixed temperature of 10° C., and by varying the shear rate from 10 to 500 s$^{-1}$.

The viscosity values obtained (expressed in Pa·s) are gathered in Table 6 below.

TABLE 6

| Shear rate | Crude petroleum | Crude petroleum + 500 ppm C2 (that is 100 ppm am) | Crude petroleum + 400 ppm C2 + 100 ppm PIBSI (that is in am: 80 ppm C2 + 50 ppm PIBSI; weight ratio 1.6:1) | Crude petroleum + 400 ppm C2 + 100 ppm Res.1 (that is in am: 80 ppm C2 + 50 ppm Res1; weight ratio 1.6:1) |
|---|---|---|---|---|
| $10\ s^{-1}$ | 22.45 | 0.65 | 1.61 | 1.02 |
| $100\ s^{-1}$ | 6.30 | 0.19 | 0.55 | 0.18 |
| $500\ s^{-1}$ | 1.01 | 0.16 | 0.39 | 0.18 |

These results set forth in Tables 5 and 6 above show that the composition of additives according to the invention (C2+Res.1 combination) makes it possible to significantly reduce the viscosity, with respect to the three comparatives.

The composition according to the invention furthermore makes it possible to reduce the quantity of EVA active material used (compound C2), while improving the viscosity reduction performance during cooling, which is not possible with PIBSI doping at an equivalent total rate of additives employed.

3.2. Flow Threshold Measurements

Flow threshold measurements at 10° C. have also been carried out on the same crude petroleum additivated with the same compounds as in example 3.1 above.

The measurements have been carried out with an Anton Paar MCR 302 rheometer, 27 mm coaxial cylinder geometry, CSR drive, at a shear rate of $38\ s^{-1}$.

The flow threshold values obtained (expressed in Pa) are gathered in Table 7 below.

TABLE 7

| Crude petroleum | Crude petroleum + 500 ppm C2 (that is 100 ppm am) | Crude petroleum + 400 ppm C2 + 100 ppm PIBSI (that is in am: 80 ppm C2 + 50 ppm PIBSI; weight ratio 1.6:1) | Crude petroleum + 400 ppm C2 + 100 ppm Res.1 (that is in am: 80 ppm C2 + 50 ppm Res1; weight ratio 1.6:1) |
|---|---|---|---|
| 52.31 | 3.16 | 6.84 | 3.43 |

These results show that the composition of additives according to the invention (C2+Res.1 combination) makes it possible to significantly reduce the flow threshold, with respect to the three comparatives.

The composition according to the invention furthermore makes it possible to reduce the amount of active material EVA used (compound C2), while improving the performance in terms of pour point reduction, which is not possible with PIBSI doping at an equivalent total rate of additives employed.

Example 4: Compositions of Additives Comprising C3+Res1

4.1. Dynamic Viscosity Measurements

A composition of additives according to the invention has been prepared from the compound C3 and the resin Res1, diluted in an organic solvent consisting of a mixture of C9 aromatic compounds and xylene:

Composition of additives A3: C3+Res1 with a C3/Res1 weight ratio of 4:1 (that is in am 3.04:1).

This composition A3 comprises 12% by weight of additives and 88% by weight of organic solvent.

Composition A3 has been incorporated into crude petroleum, having a density at 15° C. of 0.911 g/cm³ and a pour point of +15° C.

Dynamic viscosity measurements have been carried out with an Anton Paar MCR 302 rheometer, 27 mm coaxial cylinder geometry, CSR drive, and at a shear rate of $38\ s^{-1}$.

The viscosity values obtained (expressed in mPa·s) are gathered in Table 8 below.

TABLE 8

|  | Viscosity at 23° C. | Viscosity at 18° C. |
|---|---|---|
| Comparative: non-additivated crude petroleum | 1000 | 2000 |
| Invention: crude petroleum + 1250 ppm A3 | 500 | 1000 |

The above results show that the dynamic viscosity of crude petroleum including the composition of additives according to the invention is lower than the dynamic viscosity of crude petroleum alone (comparative).

Tests have also been carried out, by comparing composition A3 with resin Res.1 alone.

The viscosity values obtained (expressed in mPa·s) are gathered in Table 9 below.

TABLE 9

|  | Viscosity at 23° C. | Viscosity at 18° C. |
|---|---|---|
| Comparative: non-additivated crude petroleum | 1000 | 2000 |
| Comparative: crude petroleum + 50 ppm Res.1 (25 ppm am) | 1000 | 2000 |
| Invention: crude petroleum + 9.6 ppm C3 + 2.4 ppm Res.1 (3.65 ppm am C3 + 1.2 ppm am Res1; weight ratio C1/Res1 = 3.04:1) | 700 | 1500 |

The above results show that the addition of the resin alone does not lower the viscosity of this crude petroleum. It is the synergy between both compounds C3 and Res1 that substantially lowers the viscosity.

The invention claimed is:

1. A composition of additives comprising:
   (1) at least one first compound selected from:
   (i) copolymers of ethylene and vinyl acetate having a molar mass Mn in the range from 10,000 to 60,000 g.mol$^1$, grafted by at least one alkyl (meth) acrylate group, the alkyl chain of which is saturated and contains from 12 to 30 carbon atoms; and
   (2) at least one second compound selected from modified alkylphenol-aldehyde resins;
   said modified alkylphenol-aldehyde resins being obtainable by Mannich reaction of an alkylphenol-aldehyde condensation resin:
   (iii) with at least one aldehyde and/or ketone having from 1 to 8 carbon atoms, and
   (iv) at least one hydrocarbon compound comprising at least one alkyl polyamine group having from 1 to 30 carbon atoms;
   said alkylphenol-aldehyde condensation resin being itself obtainable by condensation of:
   (v) at least one alkylphenol substituted with at least one linear or branched alkyl group having from 1 to 30 carbon atoms, with
   (vi) at least one aldehyde and/or ketone having from 1 to 8 carbon atoms; and
   wherein the weight ratio of the amount of the first compound (1) to the amount of the second compound (2) is in the range from 1 to 10.

2. The composition according to claim 1, wherein the weight ratio of the amount of the first compound (1) to the amount of the second compound (2) is in the range selected from the group consisting of 1 to 6, from 1 to 5 and from 1.5 to 4.

3. The composition according to claim 1, wherein the alkyl (meth) acrylate grafts of the polymers (i) include a saturated alkyl chain selected from the group consisting of having from 14 to 26 carbon atoms and from 18 to 22 carbon atoms.

4. The composition according to claim 1, wherein said modified alkylphenol-aldehyde resins are obtainable by Mannich reaction of an alkylphenol -aldehyde condensation resin:
   with at least one aldehyde and/or ketone having from 1 to 4 carbon atoms; and
   at least one hydrocarbon compound comprising at least one alkyl polyamine group having from 4 to 30 carbon atoms,
   said alkylphenol-aldehyde condensation resin being itself obtainable by condensation:
   of a monoalkylphenol with
   at least one aldehyde and/or one ketone having from 1 to 4 carbon atoms.

5. The composition according to claim 1, wherein the modified alkylphenol-aldehyde resins are obtainable from p-nonylphenol, formaldehyde and at least one hydrocarbon compound comprising at least one alkyl polyamine group.

6. The composition according to claim 1, wherein the modified alkylphenol-aldehyde resins are obtainable from p-nonylphenol and the average number of phenol rings per modified p-nonylphenol-aldehyde resin molecule is selected from the group consisting of from 6 to 25, from 8 to 17 and from 9 to 16.

7. The composition according to claim 1, wherein the hydrocarbon compound having at least one alkyl polyamine group comprises at least two primary amine groups and a fatty chain selected from the group consisting of having from 12 to 24 carbon atoms and from 12 to 22 carbon atoms.

8. The composition according to claim 1, characterised in that said composition further comprises an organic solvent selected from the group consisting of an aromatic solvent, a liquid hydrocarbon diesel fraction, and mixtures of such solvents.

9. A method for reducing the viscosity of a liquid petroleum product and/or for limiting the phenomena of paraffin aggregation, and/or for paraffin dispersion and/or for delaying paraffin crystallisation, in a liquid crude petroleum product, comprising the following steps:
   preparing a composition of additives as defined in claim 1, and
   introducing said composition of additives into said liquid petroleum product, in an amount such that the total content of the two compounds (1) and (2) is in the range selected from the group consisting of from 10 to 2500 ppm by weight, from 20 to 1800 ppm by weight, from 50 to 1500 ppm by weight, from 70 to 1000 ppm by weight, from 100 to 800 ppm by weight, from 400 to 700 ppm by weight and from 550 to 650 ppm by weight.

10. The method according to claim 9, wherein the liquid petroleum product is selected from the group consisting of a diesel oils, crude petroleum and heavy fuel oils.

* * * * *